(12) United States Patent
Young

(10) Patent No.: US 12,336,665 B1
(45) Date of Patent: Jun. 24, 2025

(54) LIQUID-REMOVING PRESS FOR CANNED GOODS

(71) Applicant: Leslie Young, Williamsburg, VA (US)

(72) Inventor: Leslie Young, Williamsburg, VA (US)

( * ) Notice: Subject to any disclaimer, the term of this patent is extended or adjusted under 35 U.S.C. 154(b) by 336 days.

(21) Appl. No.: 18/088,840

(22) Filed: Dec. 27, 2022

(51) Int. Cl.
| | |
|---|---|
| *B30B 9/04* | (2006.01) |
| *A47J 43/04* | (2006.01) |
| *A47J 43/044* | (2006.01) |
| *B30B 1/24* | (2006.01) |
| *B67B 7/00* | (2006.01) |
| *B67B 7/44* | (2006.01) |

(52) U.S. Cl.
CPC .............. *A47J 43/044* (2013.01); *B30B 1/24* (2013.01); *B30B 9/04* (2013.01); *B67B 7/38* (2013.01); *B67B 7/44* (2013.01); *A47J 2043/04454* (2013.01)

(58) Field of Classification Search
CPC .. B30B 9/04; B30B 9/06; B30B 9/321; B30B 15/08; B30B 1/24; A47J 43/044; A47J 2043/04454; B67B 7/38; B67B 7/44
USPC ......................................... 100/94, 98 R, 104
See application file for complete search history.

(56) References Cited

U.S. PATENT DOCUMENTS

| | | | | |
|---|---|---|---|---|
| 3,286,345 | A | * | 11/1966 | Van Wagner ............. B67B 7/38 83/357 |
| 3,995,544 | A | | 12/1976 | Farley |
| 4,334,469 | A | * | 6/1982 | Tanner .................... B30B 9/321 100/255 |
| 5,322,093 | A | * | 6/1994 | O'Neil ...................... B09B 3/00 62/60 |
| 5,419,245 | A | | 5/1995 | Short |
| 7,017,476 | B2 | | 3/2006 | Squires |
| 7,162,952 | B1 | | 1/2007 | Michaud |
| D574,198 | S | | 8/2008 | Head |
| 10,653,275 | B2 | | 5/2020 | Guenther |
| 2005/0257699 | A1 | | 11/2005 | Wimberly |
| 2006/0042480 | A1 | | 3/2006 | Blais |

FOREIGN PATENT DOCUMENTS

WO     2019245615     12/2019

* cited by examiner

*Primary Examiner* — Jimmy T Nguyen
(74) *Attorney, Agent, or Firm* — Kyle A. Fletcher, Esq.

(57) ABSTRACT

The liquid-removing press for canned goods includes a can opener mechanism, a can piercing mechanism, a presser mechanism, an enclosure, and a top portion. The liquid-removing press for canned goods may be a kitchen appliance that may be operable to open a can of food and to press fluid out of the can. When activated, the can opener mechanism may separate a lid of the can held within the enclosure, the can piercing mechanism may pierce the bottom of the can in order to create a drainage hole, and the presser mechanism may press the lid down onto the contents of the can such that the fluid is forced out of the can through the drainage hole.

20 Claims, 7 Drawing Sheets

LIQUID-REMOVING PRESS FOR CANNED GOODS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of kitchen counter-top appliances, more specifically, a liquid-removing press for canned goods.

SUMMARY OF INVENTION

The liquid-removing press for canned goods comprises a can opener mechanism, a can piercing mechanism, a presser mechanism, an enclosure, and a top portion. The liquid-removing press for canned goods may be a kitchen appliance that may be operable to open a can of food and to press fluid out of the can. When activated, the can opener mechanism may separate a lid of the can from the can held within the enclosure, the can piercing mechanism may pierce the bottom of the can in order to create a drainage hole, and the presser mechanism may press the lid down onto the contents of the can such that the fluid is forced out of the can through the drainage hole. As a non-limiting example, the liquid-removing press for canned goods may press water or oil out of canned tuna.

An object of the invention is to open a can of food.

Another object of the invention is to pierce the bottom of the can of food to create a drainage hole.

A further object of the invention is to press down on the top of the can top force fluid out of the can through the drainage hole.

Yet another object of the invention is to provide a drawer to collect the fluid pressed out of the can of food.

These together with additional objects, features and advantages of the liquid-removing press for canned goods will be readily apparent to those of ordinary skill in the art upon reading the following detailed description of the presently preferred, but nonetheless illustrative, embodiments when taken in conjunction with the accompanying drawings.

In this respect, before explaining the current embodiments of the liquid-removing press for canned goods in detail, it is to be understood that the liquid-removing press for canned goods is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the liquid-removing press for canned goods.

It is therefore important that the claims be regarded as including such equivalent construction insofar as they do not depart from the spirit and scope of the liquid-removing press for canned goods. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
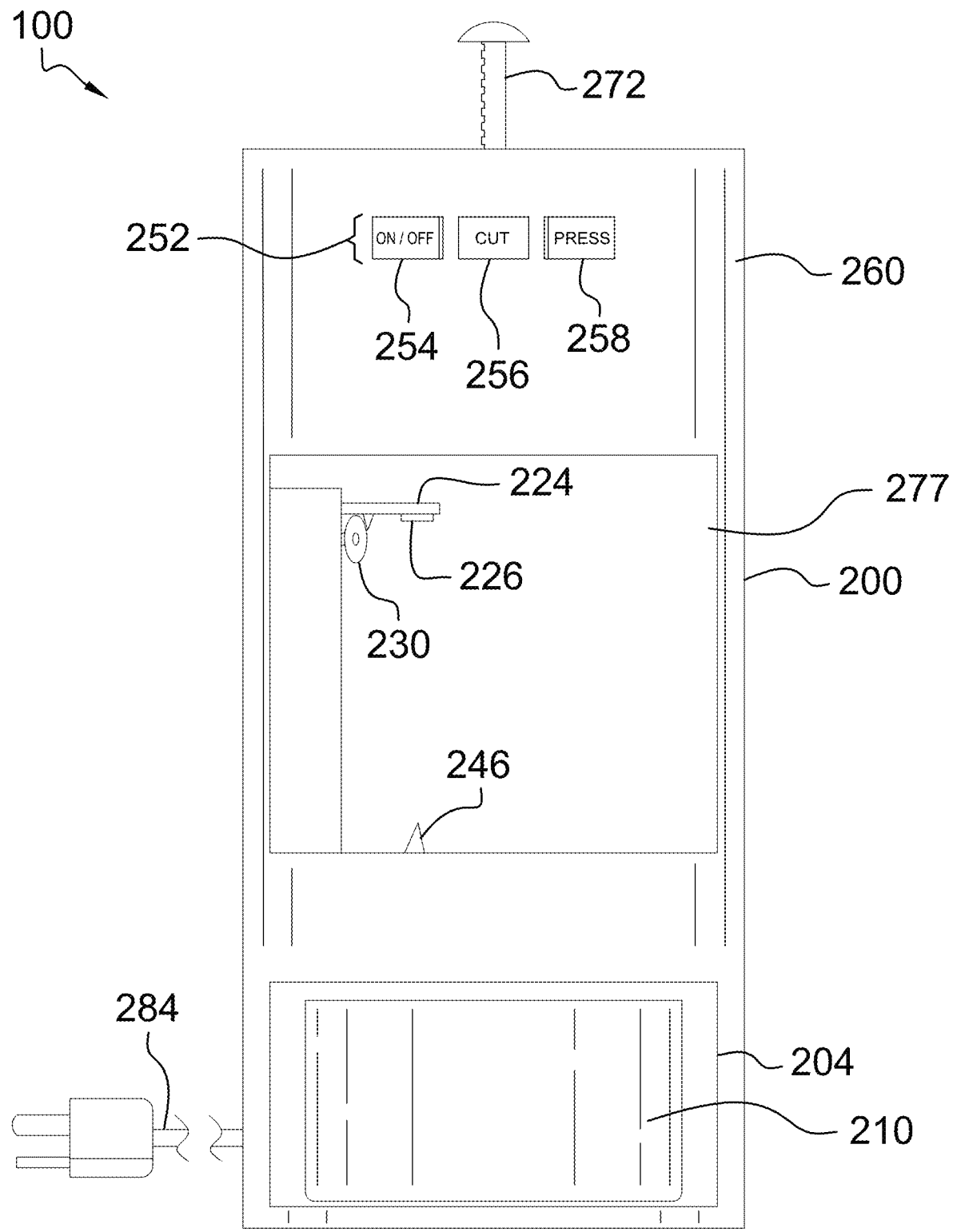
FIG. 1 is a front view of an embodiment of the disclosure.
Figure 2:
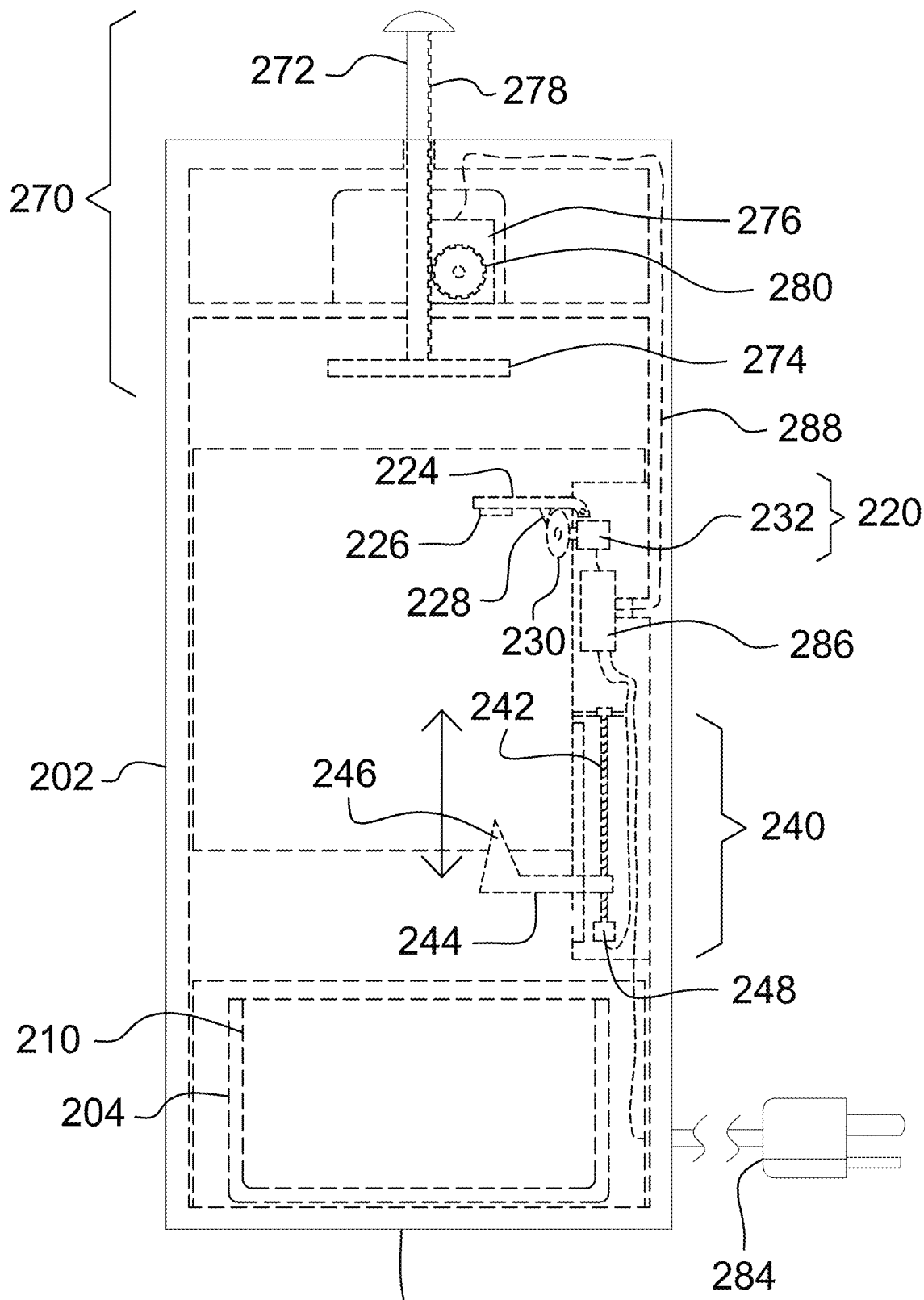
FIG. 2 is a rear detail view of an embodiment of the disclosure.
Figure 3:
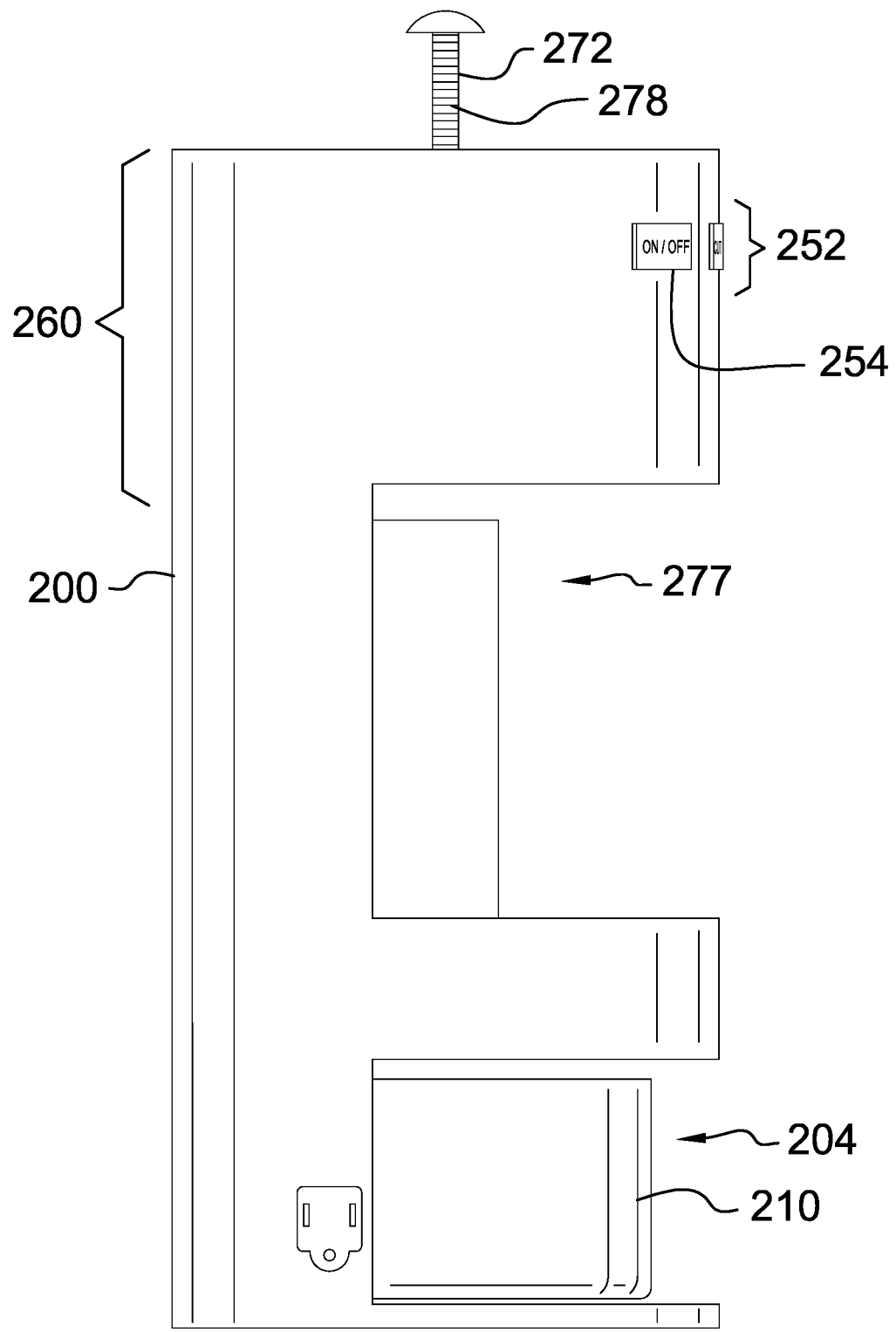
FIG. 3 is a left side view of an embodiment of the disclosure.
Figure 4:
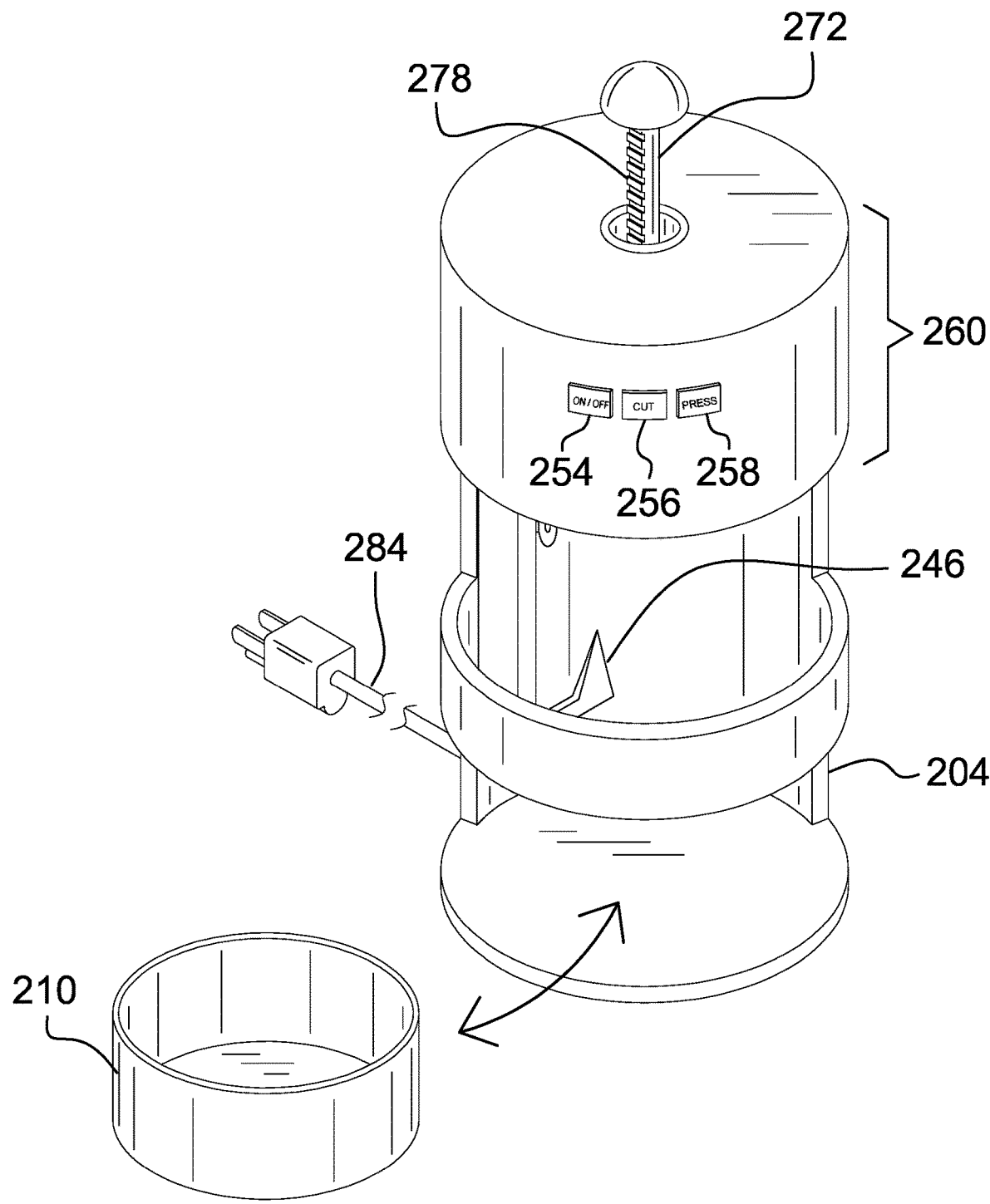
FIG. 4 is a front isometric view of an embodiment of the disclosure.
Figure 5:
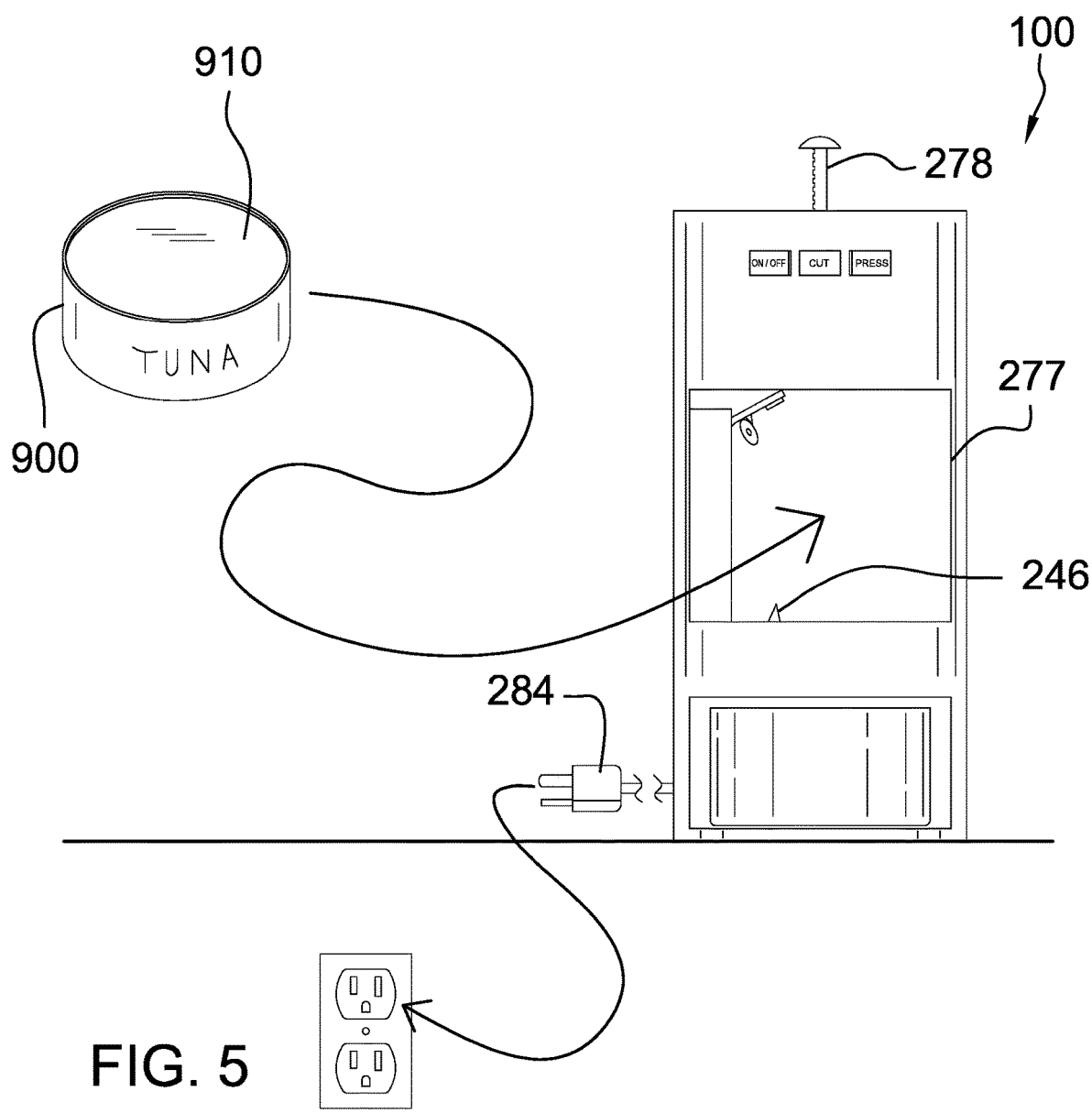
FIG. 5 is a detail view of an embodiment of the disclosure, illustrating insertion of the can of food.
Figure 6:
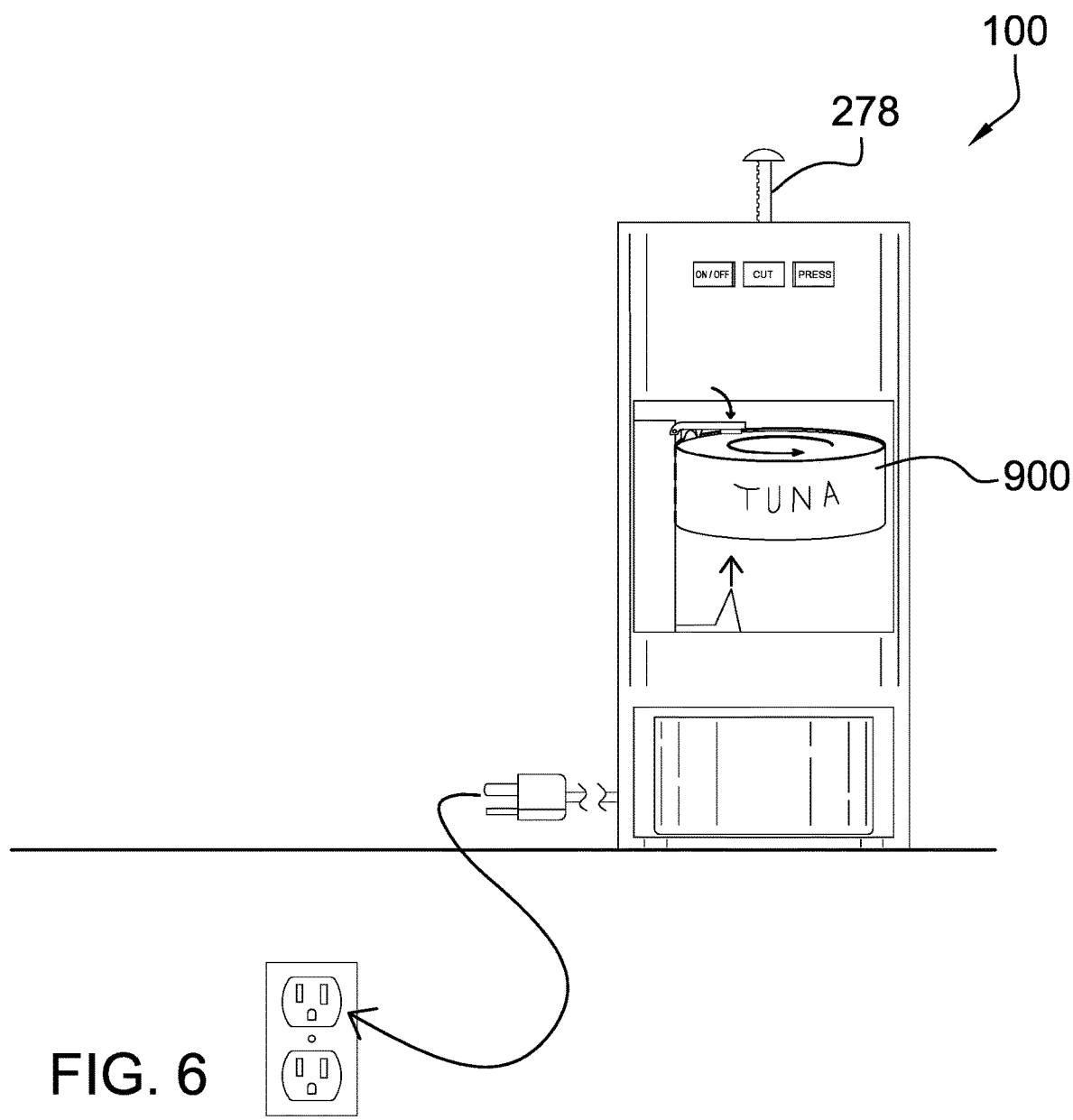
FIG. 6 is a detail view of an embodiment of the disclosure, illustrating opening and piercing the can.
Figure 7:
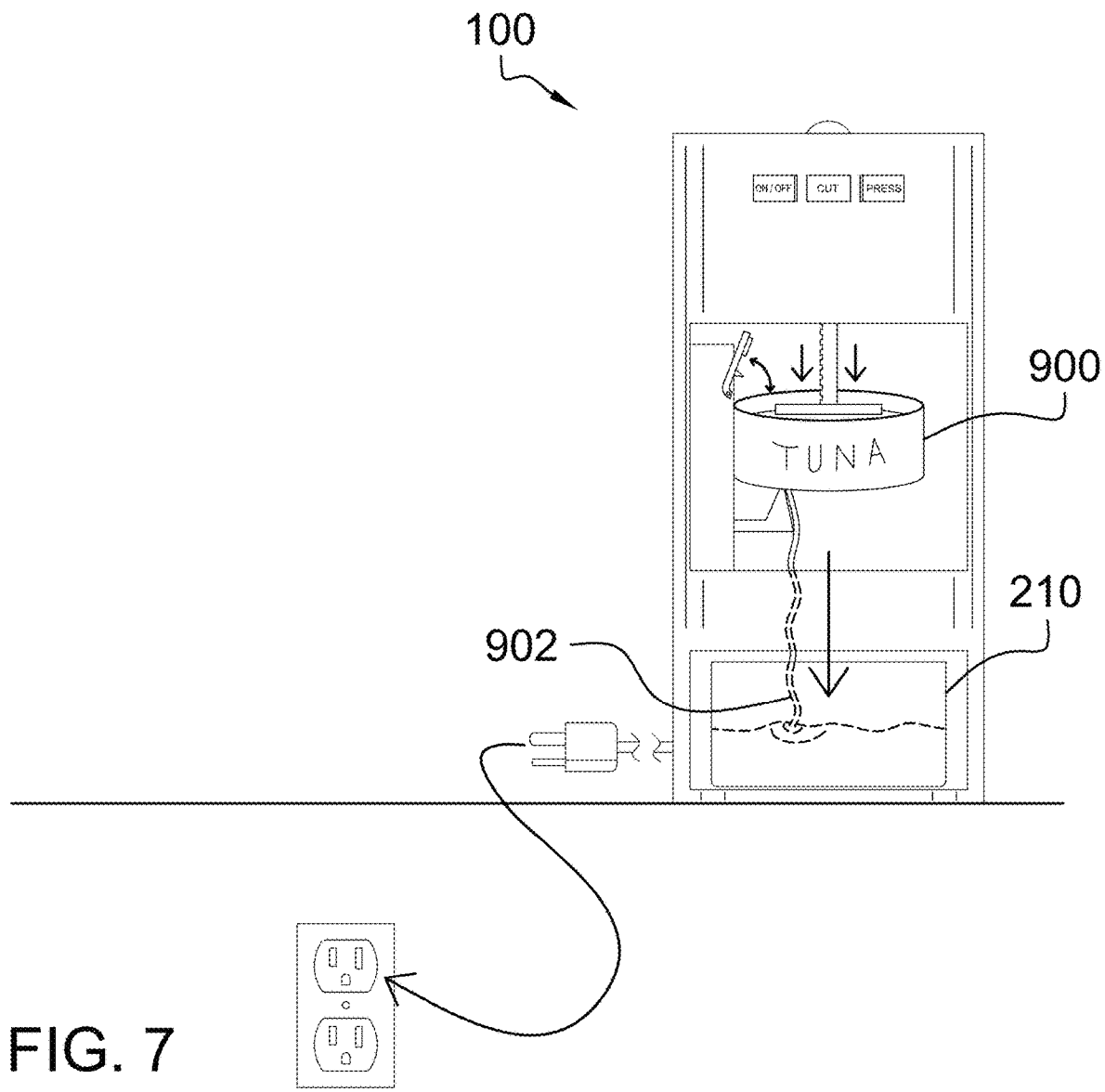
FIG. 7 is a detail view of an embodiment of the disclosure, illustrating pressing fluid out of the can and collecting the fluid in the drawer.

Detailed reference will now be made to a first potential embodiment of the disclosure, which is illustrated in FIGS. 1 through 7.

The liquid-removing press for canned goods 100 (hereinafter invention) comprises a can opener mechanism 220, a can piercing mechanism 240, a presser mechanism 270, an enclosure 200, and a top portion 260. The invention 100 may be a kitchen appliance that may be operable to open a can 900 of food and to press fluid 902 out of the can 900. When activated, the can opener mechanism 220 may separate a lid 910 of the can 900 from the can 900 held within the enclosure 200, the can piercing mechanism may pierce the bottom of the can 900 in order to create a drainage hole, and the presser mechanism 270 may press the lid 910 down onto the contents of the can 900 such that the fluid 902 is forced out of the can 900 through the drainage hole. As a non-limiting example, the invention 100 may press water or oil out of canned tuna.

The can opener mechanism 220 may comprise a cutting blade 228, a can opener gear 230, and a can opener motor 232. The can opener mechanism 220 may be coupled to a side wall 202 inside of the enclosure 200. The enclosure 200 is further defined with a can opening 277. The can opening 277 provides ingress and egress of the can 900. The cutting blade 228 may project downwards from a midpoint of a can opener arm 224. The can opener gear 230 may be coupled to the can opener motor 232 such that the can opener motor 232 may cause rotation of the can opener gear 230 when the can opener motor 232 is energized.

With the can 900 placed within the enclosure 200, the can opener arm 224 may be positioned above the can 900 such that the cutting blade 228 punctures the lid 910 of the can 900 and a lip of the can 900 is secured between the can opener arm 224 and the can opener gear 230. The can opener motor 232 may be energized and rotation of the can opener gear 230 may cause rotation of the can 900 around a vertically-oriented axis. As the can 900 rotates, the cutting blade 228 may separate the lid 910 from the can 900. A magnet 226 may assist in supporting the can 900 and/or may retain the lid 910 in position as the lid 910 is separated from the can 900.

The can piercing mechanism 240 may comprise a piercing arm 244, a piercing motor 248, and a lead screw 242. The can piercing mechanism 240 may be coupled to the side wall 202 inside of the enclosure 200. A piercing tip 246 may project upwards from the distal end of the piercing arm 244. The lead screw 242 may be vertically-oriented. The lead screw 242 may be coupled to the piercing motor 248 such that energizing the piercing motor 248 may rotate the lead screw 242. The top of the lead screw 242 may be supported by a bushing.

The piercing arm 244 may be threadedly coupled to the lead screw 242 such that rotation of the lead screw 242 in a first rotational direction may move the piercing arm 244 upwards and rotation of the lead screw 242 in a second rotational direction may move the piercing arm 244 downwards. The piercing arm 244 may be operable to pierce the bottom of the can 900 using the piercing tip 246 located at the distal end of the piercing arm 244 when the piercing arm 244 is moved upwards by the lead screw 242. The piercing arm 244 may be operable to withdraw the piercing tip 246 from the drainage hole created by piercing the bottom of the can 900 when the piercing arm 244 is moved downwards by the lead screw 242.

The presser mechanism 270 may comprise a presser plate 274, a presser shaft 272, and a presser motor 276. The presser mechanism 270 may be located within the top portion 260 such that the presser mechanism 270 is positioned above the can 900 when the top portion 260 is an affixture of the enclosure 200. The presser mechanism 270 may push the presser plate 274 down against the lid 910 of the can 900 to compress the contents of the can 900 such that the fluid 902 is squeezed out of the can 900.

The presser plate 274 may be a horizontally-oriented circular plate that may be positioned above the can 900. The presser shaft 272 may be a vertically-oriented armature. The bottom of the presser shaft 272 may be coupled to the top center of the presser plate 274.

The presser motor 276 may be coupled to the top portion 260. A pinion gear 280 may be coupled to the presser motor 276 such that energizing the presser motor 276 may cause rotation of the pinion gear 280. The presser shaft 272 may comprise a rack gear 278. The pinion gear 280 may engage the rack gear 278 such that rotation of the pinion gear 280 may cause linear, vertical movement of the presser shaft 272. Specifically, rotation of the pinion gear 280 in a third rotational direction may cause the presser shaft 272 to move downwards and may compress the contents of the can 900. Rotation of the pinion gear 280 in a fourth rotational direction may cause the presser shaft 272 to move upwards and may withdraw the presser plate 274 from the top of the can 900.

The enclosure 200 may be a hollow vertical cylinder. The enclosure 200 may comprise the side wall 202 and a bottom wall 206. The bottom of the side wall 202 may comprise a drawer aperture 204. The drawer aperture 204 may provide access to insert and remove a drawer 210 at the bottom of the enclosure 200. The drawer 210 may be operable to collect the fluid 902 that is squeezed out of the can 900 through the drainage hole.

In some embodiments, the can 900 may be supported from beneath such that the can 900 is held at a height within the enclosure 200 and the fluid 902 is free to fall to the bottom of the enclosure 200. As non-limiting examples, the can 900 may be supported by an open grillwork or side supports projecting inward from the side wall 202 of the enclosure 200

One or more operator controls 252 may be adapted for a user to control the operation of the can opener mechanism 220, the can piercing mechanism 240, and the presser mechanism 270. The one or more operator controls 252 may comprise an ON/OFF control 254, a cut control 256, and a press control 258. The ON/OFF control 254 may energize and deenergize the invention 100. The cut control 256 may energize and deenergize the can opener mechanism 220. The press control 258 may energize and deenergize the presser mechanism 270. In some embodiments, the can piercing mechanism 240 and the presser mechanism 270 may be sequenced such that the can piercing mechanism 240 may create the drainage hole in the bottom of the can 900 prior to the presser mechanism squeezing the contents of the can 900. The can piercing mechanism 240 may be energized by the cut control 256, by the press control 258, or by both. As a non-limiting example, the cut control 256 may cause the piercing arm 244 to move upwards and the press control 258 may cause the piercing arm 244 to move downwards.

The invention 100 may receive electrical power from an AC power cord 284. A step down transformer 286 may step the voltage down to voltages that are compatible with internal components of the invention 100. The ON/OFF control 254 may apply and remove power to the input of the step down transformer 286. The output of the step down transformer 286 may be distributed to the can opener motor 232, the piercing motor 248, the presser motor 276, or any combination thereof via wiring 288.

In use, the top portion 260 may be removed from the top of the enclosure 200 and a can 900 may be placed into the enclosure 200. The invention 100 may be energized using the ON/OFF control 254. The user may pivot the can opener arm 224 into position on top of the can 900. The user may activate the cut control 256 to energize the can opener mechanism 220 such that the lid 910 is separated from the can 900. The user may pivot the can opener arm 224 upwards and away from the can 900. The top portion 260 is an affixture of the enclosure 200. The user may activate the press control 258 control to energize the can piercing mechanism 240 and the presser mechanism 270. The can piercing mechanism 240 may pierce the bottom of the can 900 to create a drainage hole and the presser mechanism 270 may squeeze the contents of the can 900 to force fluid 902 out of the can 900. The can piercing mechanism 240 may lower to a non-piercing position after the piercing operation. The presser mechanism 270 may raise to a non-pressing position after the pressing operation. The invention 100 may be deenergized using the ON/OFF control 254, the can 900 may be removed from the enclosure 200 via the can opening 277, and the drawer 210 may be removed from the bottom of the enclosure 200 to dispose of the fluid 902.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, "AC" may be an acronym for alternating current.

As used in this disclosure, an "aperture" may be an opening in a surface or object. Aperture may be synonymous with hole, slit, crack, gap, slot, or opening.

In this disclosure, "compress" may refer to forcing into a smaller space.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw. In some embodiments, a control may alter an electrical property of a circuit such as resistance, inductance, or capacitance.

As used herein, the words "couple", "couples", "coupled" or "coupling", may refer to connecting, either directly or indirectly, and does not necessarily imply a mechanical connection.

As used in this disclosure, the terms "distal" and "proximal" may be used to describe relative positions. Distal refers to the object, or the end of an object, that is situated away from the point of origin, point of reference, or point of attachment. Proximal refers to an object, or end of an object, that is situated towards the point of origin, point of reference, or point of attachment. Distal implies 'farther away from' and proximal implies 'closer to'. In some instances, the point of attachment may be the where an operator or user of the object makes contact with the object. In some instances, the point of origin or point of reference may be a center point, a central axis, or a centerline of an object and the direction of comparison may be in a radial or lateral direction.

As used herein, "energize" and/or "energization" may refer to the application of an electrical potential to a system or subsystem.

As used in this disclosure, "horizontal" may be a directional term that refers to a direction that is perpendicular to the local force of gravity. Unless specifically noted in this disclosure, the horizontal direction is always perpendicular to the vertical direction.

As used in this disclosure, a "magnet" may be an ore, alloy, or other material that has its component atoms arranged so that the material exhibits properties of magnetism such as attracting iron-containing objects or aligning itself in an external magnetic field.

As used here, the word "midpoint" may refer to a point that is between the ends of an object. An "exact midpoint" may refer to a midpoint that is equidistant from edges of the object in at least one direction. Unless otherwise stated, a midpoint is not required to be at the exact center of the object but instead may be separated from the exact midpoint by up to 50% of the distance from the exact midpoint to the farthest edge, farthest end, or farthest corner.

As used in this disclosure, a "motor" may refer to a device that transforms energy from an external power source into mechanical energy.

As used herein, the word "pivot" may include any mechanical arrangement that allows for rotational motion. Non-limiting examples of pivots may include hinges, holes, posts, dowels, pins, points, rods, shafts, balls, and sockets, either individually or in combination.

As used in this disclosure, "vertical" may refer to a direction that is parallel to the local force of gravity. Unless specifically noted in this disclosure, the vertical direction is always perpendicular to horizontal.

Throughout this document references to "wire", "wires", "wired", or "wiring" may describe and/or show a single conductor when, in fact, two conductors may be required to power or control a subsystem; a convention used herein is that the common return conductor to which all electrical subsystems are connected may not be shown in order to clarify the figures. This common return conductor is a continuous electrical path and does not pass through any type of switch or other electrical component other than the possibility of passing through one or more connectors.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A liquid-removing press for canned goods comprising:
an enclosure having a top portion,
a can opener mechanism located within the enclosure,
a can piercing mechanism located within the enclosure, and
a presser mechanism located within the top portion of the enclosure;
wherein the liquid-removing press for canned goods is a kitchen appliance that is operable to open a can of food and to press fluid out of the can;
wherein when activated, the can opener mechanism separates a lid of the can held within the enclosure, the can piercing mechanism pierces the bottom of the can in order to create a drainage hole, and the presser mechanism presses the lid down onto the contents of the can such that the fluid is forced out of the can through the drainage hole.

2. The liquid-removing press for canned goods according to claim 1
wherein the can opener mechanism comprises a cutting blade, a can opener gear, and a can opener motor;
wherein the can opener mechanism is coupled to a side wall inside of the enclosure;
wherein the cutting blade projects downwards from a midpoint of a can opener arm;
wherein the can opener gear is coupled to the can opener motor such that the can opener motor causes rotation of the can opener gear when the can opener motor is energized.

3. The liquid-removing press for canned goods according to claim 2
wherein with the can in place within the enclosure, the can opener arm is positioned above the can such that the cutting blade punctures the lid of the can and a lip of the can is secured between the can opener arm and the can opener gear;
wherein the can opener motor is energized and rotation of the can opener gear causes rotation of the can around a vertically-oriented axis;
wherein as the can rotates, the cutting blade separates the lid from the can.

4. The liquid-removing press for canned goods according to claim 3
wherein a magnet assists in supporting the can and/or retains the lid in position as the lid is separated from the can.

5. The liquid-removing press for canned goods according to claim 3
wherein the can piercing mechanism comprises a piercing arm, a piercing motor, and a lead screw;
wherein the can piercing mechanism is coupled to the side wall inside of the enclosure;
wherein a piercing tip projects upwards from the distal end of the piercing arm.

6. The liquid-removing press for canned goods according to claim 5
wherein the lead screw is vertically-oriented;
wherein the lead screw is coupled to the piercing motor such that energizing the piercing motor rotates the lead screw.

7. The liquid-removing press for canned goods according to claim 6
wherein the piercing arm is threadedly coupled to the lead screw such that rotation of the lead screw in a first rotational direction moves the piercing arm upwards and rotation of the lead screw in a second rotational direction moves the piercing arm downwards.

8. The liquid-removing press for canned goods according to claim 7
wherein the piercing arm is operable to pierce the bottom of the can using the piercing tip located at the distal end of the piercing arm when the piercing arm is moved upwards by the lead screw.

9. The liquid-removing press for canned goods according to claim 8
wherein the piercing arm is operable to withdraw the piercing tip from the drainage hole created by piercing the bottom of the can when the piercing arm is moved downwards by the lead screw.

10. The liquid-removing press for canned goods according to claim 9
wherein the presser mechanism comprises a presser plate, a presser shaft, and a presser motor;
wherein the presser mechanism is located within the top portion such that the presser mechanism is positioned above the can.

11. The liquid-removing press for canned goods according to claim 10
wherein the presser mechanism pushes the presser plate down against the lid of the can to compress the contents of the can such that the fluid is squeezed out of the can.

12. The liquid-removing press for canned goods according to claim 11
wherein the presser plate is a horizontally-oriented circular plate that is positioned above the can;
wherein the presser shaft is a vertically-oriented armature;
wherein the bottom of the presser shaft is coupled to the top center of the presser plate.

13. The liquid-removing press for canned goods according to claim 12
wherein the presser motor is coupled to the top portion;
wherein a pinion gear is coupled to the presser motor such that energizing the presser motor causes rotation of the pinion gear;
wherein the presser shaft comprises a rack gear.

14. The liquid-removing press for canned goods according to claim 13
wherein the pinion gear engages the rack gear such that rotation of the pinion gear causes linear, vertical movement of the presser shaft.

15. The liquid-removing press for canned goods according to claim 14
wherein rotation of the pinion gear in a third rotational direction causes the presser shaft to move downwards and compresses the contents of the can.

16. The liquid-removing press for canned goods according to claim 15
wherein rotation of the pinion gear in a fourth rotational direction causes the presser shaft to move upwards and withdraws the presser plate from the top of the can.

17. The liquid-removing press for canned goods according to claim 16
wherein the enclosure is a hollow vertical cylinder;
wherein the enclosure comprises the side wall and a bottom wall;
wherein the bottom of the side wall comprises a drawer aperture;
wherein the drawer aperture provides access to insert and remove a drawer at the bottom of the enclosure;
wherein the drawer is operable to collect the fluid that is squeezed out of the can through the drainage hole.

18. The liquid-removing press for canned goods according to claim 17
wherein one or more operator controls are adapted for a user to control the operation of the can opener mechanism, the can piercing mechanism, and the presser mechanism;
wherein the one or more operator controls comprise an ON/OFF control, a cut control, and a press control;
wherein the ON/OFF control energizes and deenergizes the liquid-removing press for canned goods;
wherein the cut control energizes and deenergizes the can opener mechanism;
wherein the press control energizes and deenergizes the presser mechanism.

19. The liquid-removing press for canned goods according to claim 18 wherein the can piercing mechanism and the presser mechanism are sequenced such that the can piercing mechanism creates the drainage hole in the bottom of the can prior to the presser mechanism squeezing the contents of the can;

wherein the can piercing mechanism is energized by the cut control, by the press control, or by both.

20. The liquid-removing press for canned goods according to claim 18 wherein the liquid-removing press for canned goods receives electrical power from an AC power cord;

wherein a step down transformer steps a voltage down to voltages that are compatible with internal components of the liquid-removing press for canned goods;

wherein the ON/OFF control applies and removes power to an input of the step down transformer;

wherein an output of the step down transformer is distributed to the can opener motor, the piercing motor, the presser motor, or any combination thereof via wiring.

\* \* \* \* \*